United States Patent [19]

Schneider

[11] 4,385,353
[45] May 24, 1983

[54] METHOD AND SYSTEM FOR REGULATING THE OPERATING DEPTH OF TOWED AGRICULTURAL MACHINERY, FOR EXAMPLE TRACTOR-BORNE PLOWS

[76] Inventor: Walter Schneider, Radlerstr. 3, 8950 Kaufbeuren-Neugablonz, Fed. Rep. of Germany

[21] Appl. No.: 166,389

[22] Filed: Jul. 7, 1980

[30] Foreign Application Priority Data

Jul. 7, 1979 [DE] Fed. Rep. of Germany ....... 2927585

[51] Int. Cl.$^3$ ............................................. A01B 63/14
[52] U.S. Cl. ........................................ 364/424; 172/2
[58] Field of Search ............... 364/560, 562, 424, 432, 364/565, 566; 172/2, 4, 7, 9

[56] References Cited

U.S. PATENT DOCUMENTS

| | | | |
|---|---|---|---|
| 4,064,945 | 12/1977 | Haney | 172/7 X |
| 4,077,475 | 3/1978 | Hino et al. | 172/3 |
| 4,132,272 | 1/1979 | Holloway et al. | 172/2 |
| 4,132,273 | 1/1979 | Mortonson et al. | 172/2 |
| 4,282,933 | 8/1981 | Suganami et al. | 172/7 X |

FOREIGN PATENT DOCUMENTS 2047437 11/1980 United Kingdom ..................... 172/4

*Primary Examiner*—Edward J. Wise
*Attorney, Agent, or Firm*—Antonelli, Terry & Wands

[57] ABSTRACT

In towed agricultural equipment such as tractor-borne plows, it is often very important to accurately control the operating depth of the towed equipment. Prior systems for doing this have not accurately responded by providing appropriate control necessary for doing this depending on whether the sensed variation results from changes in soil condition or changes in tractor sway. Accordingly, to improve such control, a method and apparatus are provided for determining the rate of variation of the pulling force and providing limiting values for this rate of variation. A comparison between the determined values and the limiting values is made, and the vertical position of the plow is controlled in accordance with the comparison. Acceleration of the pulling force can also be used as a variable for the control. These comparisons serve to establish whether the change in pulling force result from changes in soil condition or tractor sway. Also, the rate of variation and acceleration of plow position can be used to make this determination and, accordingly, control the plow depth.

19 Claims, 2 Drawing Figures

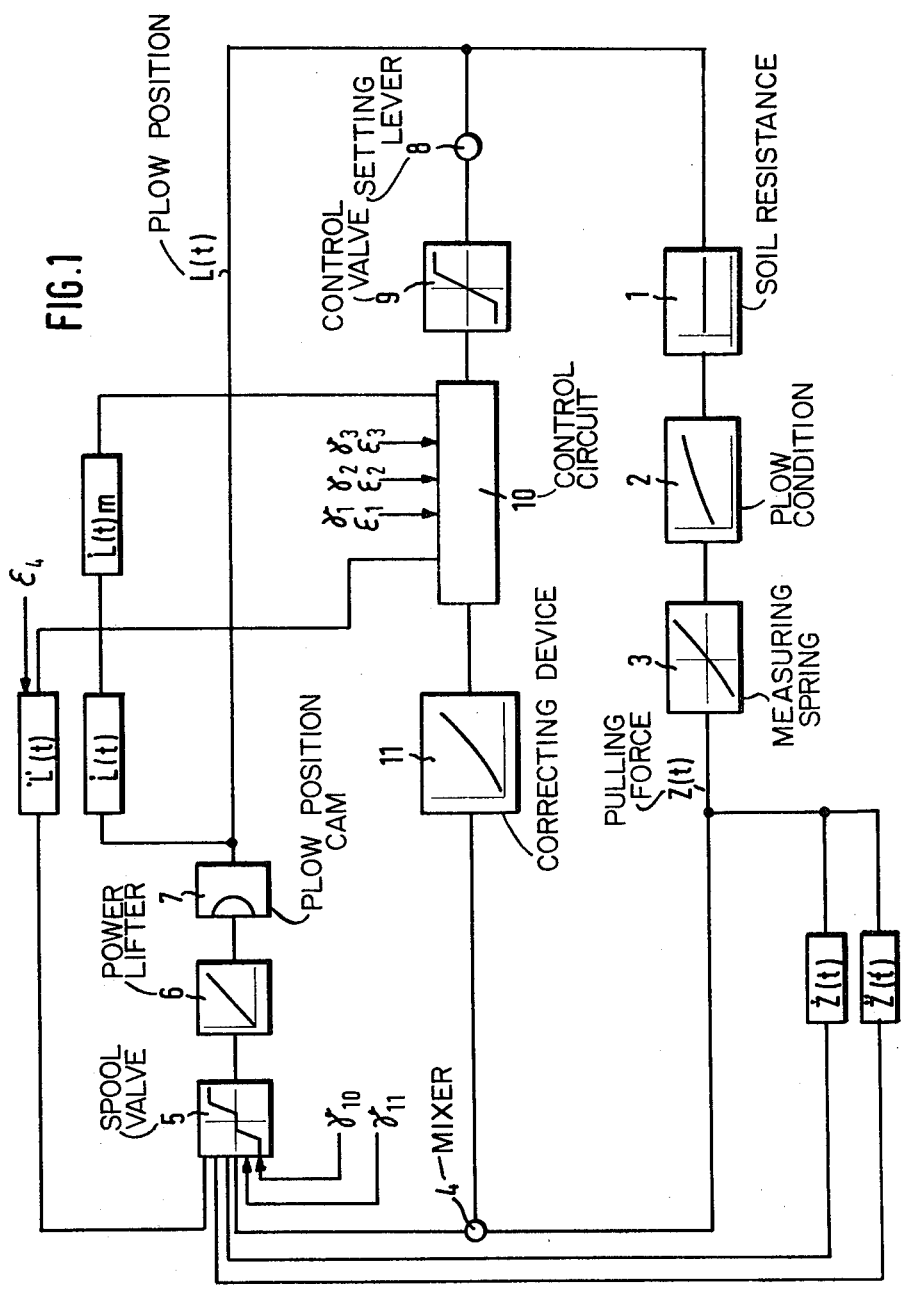

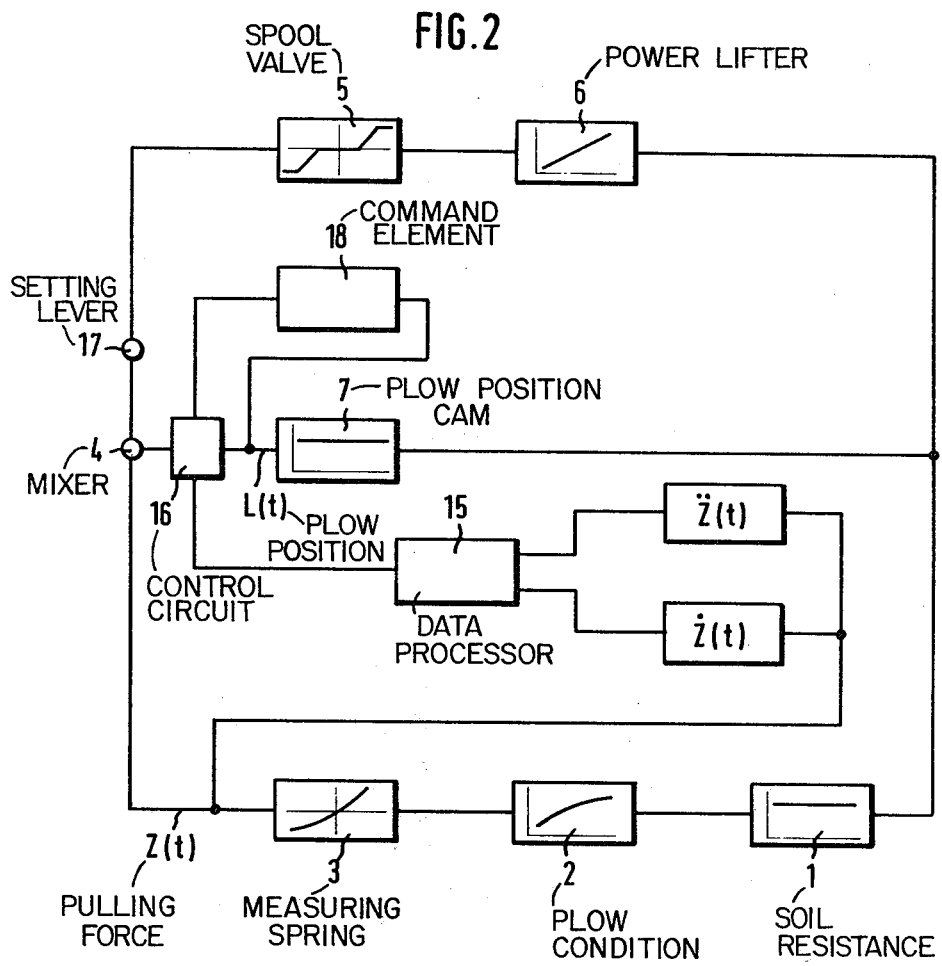

METHOD AND SYSTEM FOR REGULATING THE OPERATING DEPTH OF TOWED AGRICULTURAL MACHINERY, FOR EXAMPLE TRACTOR-BORNE PLOWS

The invention relates to a method and a system for regulating the operating depth of towed agricultural machinery such as tractorborne plows with a regulating system utilizing the plow-generated pulling force as an auxiliary control variable, or adjusting the nominal value of the pulling force to the pull resistance varying relatively slowly as the soil resistance changes, in response to the variation in the position of the plow.

In intensive farming the most exact and uniform maintenance of the operating depth in soil cultivation with plows is an important factor whose effect on the yield is substantial for different reasons. Primarily a uniform furrow depth provides for better absorption of precipitation and uniform fertilizer concentration, and also for the uniform initial growth and development of plants, especially sugar beets and potatoes.

The regulating means used in practice to date for this purpose operate according to the principle of pulling-force and/or position control.

A pulling force control system is characterized by indirect, not direct, operating depth adjustment through the pulling force dependent on the operating depth. As long as pulling force variations from a given nominal value corresponding to the desired operating depth result exclusively from tractor swaying motions these regulating systems operate satisfactorily. But if the pulling force variation is caused by changing soil resistance depth variation cannot be avoided in principle since the changed soil resistance is related to an operating depth which is different from the desired value if the condition of constant pulling force is observed.

On flat ground this disadvantage of the known regulating systems can be eliminated by position regulating systems in which the position of the plow relative to the tractor is adjustable. However position regulation is totally useless for this purpose in the case of plows moving in rough terrain.

Attempts have been made to apply the advantages of the two types of regulation to all soil surface conditions with mixed adjustments in which the pulling-force or position control system more or less dominates. But it has been found that this cannot be done to a sufficient extent, and the operation of such regulating systems is quite unsatisfactory.

In this respect a control system for the automatic depth regulation of tractor-mounted cultivating implements described in DL Pat. No. 24,280 has introduced significant improvements. In this publication it is recommended to mount on a known pull control system an additional depth regulating system acting in opposition thereto with adjustable delay in response to the relative positions of the pulling means and the implement. This arrangement made it possible for the first time to provide a regulating system in which the pulling force nominal value adjusted indirectly by the position regulating means responds slowly to a variation in the nominal value of the position when a change in the specific soil resistance occurs. In this case the adjustment is determined by a cylinder controlled by the position regulating system and acting as a correcting element.

Since the rate of pulling force variation resulting from changes in soil resistance is much lower than the rate of pulling force variation resulting from swaying motion the regulating system responds both to changes in soil resistance and to the shape of the surface of the soil being cultivated. It operates as a pure pulling force regulating system with practically constant pulling force nominal value on swaying, and substantially as a position regulating system on soils of varying specific resistance. Therefore, on soils of irregular specific resistance, the tractor driver need not continuously watch the plow depth and correct it manually when necessary.

When, as described above, this known regulating system responds both to soil resistance changes and to the shape of the surface of the soil being cultivated, this effect results from an evaluation of the observation that the soil irregularities which cause tractor sway are relatively short. These irregularities generally extend over 0.5 to 5 m. In contrast the specific resistance of most soils varies over substantially longer distances of approximately 10–30 m and more. The adjustment of the nominal value of the position by the cylinder occurs at a low rate optimally adapted to the specific soil shape, in such a way that on long-duration pulling force variations a significant nominal value adjustment is provided, but not in the case of pulling force variations resulting from tractor sway since the sway duration is not sufficient for this purpose. No variation in the adjustment rate of the pulling force nominal value by the cylinder is provided for adaptation to other forms of terrain.

This means that the regulating system always operates in the same manner and is not capable of determining whether a pulling force variation should be attributed to a change in soil resistance or to a swaying motion. This may be disadvantageous especially in the case of disturbances due to swaying motions which are caused by soil irregularities developing outside the normal range of experience, i.e. longer than 5 m. For example, when plowing soil in which root crops have been harvested, one or two of the wheels on the same side of the tractor may roll constantly along, or at a small angle to, a ridge resulting for example from a former row of potatoes. Therefore the tractor does not move on the plane determined by the terrain surface, but on a plane laterally inclined thereto by a certain angle. In this case the slow opposite correction (nominal value adjustment) can alter the pulling force undesirably so that, after a shorter or longer distance has been covered, the given position is obtained but does not correspond to the desired operating depth.

Also the specific soil resistance may change substantially to an unusual degree, for example within a few meters. In such cases the slow adjustment of the nominal value does not occur, which results in operating depth deviations since the regulating system acts practically as a pure pulling force regulating system.

In one known automatic depth regulating system for cultivating implements mounted on agricultural vehicles (German Pat. No. 2,055,403) the position transducer is disconnected in a predetermined position. The disconnection position must be adjusted to the lightest type of soil in the plot being plowed. Thus the transducer effect, which is disadvantageous in this case, is discontinued when the vehicle sways, and the system temporarily becomes a pure pulling force regulating system. But this regulating system entails the disadvantage that with swaying motions on soils whose resistance is greater than the soil resistance on which the disconnection position is based, the transducer is disconnected only when an undesirable depth variation occurs.

The object of the invention is to improve the known operating depth regulating method and system to eliminate the described disadvantages and provide for a higher quality of operation.

This object is achieved by determining the rate of variation and optionally the variation acceleration of the pulling force, and using said rate or acceleration to control the vertical position of the plow in dependence of given limiting values. In a regulating method in which the nominal value of the pulling force is adjusted on the basis of the varying pull resistance, the object is achieved by determining the time variation of the pulling force or of the position and utilizing in dependence of given limiting values the rate of pulling force or position change to control the adjustment of the nominal value of the pulling force.

A system suitable for the reduction to practice of the first disclosed method is characterized by the connection to the measuring device of a first differential device forming the first time derivative of the pulling force, and optionally of a second differential device forming the second time derivative of the pulling force. The output signals of the first differential device are impressed, alone or together with those of the second differential device, on a data processing unit in which either said signals are combined to a single value which, after comparison to one or more limiting values fed to the data processing unit, acts on a control element connected to the transducer, so that said element blocks the signal transmission from the transducer to the setting handle, the last transducer output signal being transmitted past the control element, and the proportion with which the measuring device participates in controlling the spool valve being set at its maximum value or released; or said output signals are compared separately with a limiting value fed to the data processing unit, and the differential device whose output first exceeds the corresponding limiting value blocks the control element.

A system suitable for the reduction to practice of the last disclosed method is characterized by the connection to the measuring device (measuring spring) of a differential device forming the first time derivative of the pulling force, or to the transducer (position cam) of a differential device forming the first time derivative of the position. The output of said differential device is connected to a control element (switch) preceding the correcting device. On exceeding of a first valve the pulling force or position change rate fed to the control element (switch) said element blocks the value formed by the differential device, retaining the last output value of the correcting device as long as the given value remains smaller. In addition the differential device is connected to a memory storing the last formed differential values and continuously forming the average of these values which, when lower than a second value smaller than the first introduced value and when exceeding a third value smaller than the second value of the pulling force or position change rate also supplied to the switch, which blocks as the last output value of the correcting device is retained as long as the average formed remains within the range predetermined by the first and second values.

The invention makes it possible to maintain very exactly the operating depth of a plow since the regulating system can determine whether a variation in the pulling force results from a swaying motion or from a change in soil resistance, and therefore to react to pulling force variations reliably and practically without delay as determined by different requirements derived from sway or changes in soil resistance.

Other advantageous details and features of the invention appear in the claims and in the following description in reference to the drawing.

FIG. 1 is the signal flow diagram of a regulating system comprising a correcting device for the automatic adjustment of the nominal value.

FIG. 2 is the signal flow diagram of regulating system without correcting device.

The signal flow diagrams of FIGS. 1 and 2 show clearly and schematically the situation in a tractor carrying a plow whose operating depth is adjusted by a regulating system. The soil resistance is represented by a signal transmission block 1 near the bottom of the signal flow diagram. of FIG. 1. Signal transmission block 1 is connected to a proportional-action signal transmission block 2 representing the kinematic conditions of the plow and implement mounting, and a proportional-action signal transmission block 3 represents a measuring spring for the soil resistance force to be overcome by the plow (not shown). After signal transmission block 3 a mixer 4 is provided, in which another signal formed as will be described below is superposed on the signal from signal transmission block 3. Mixer 4 is connected to a signal transmission block 5 simulating the spool valve of the tractor power lifter. In this signal flow diagram the power lifter is represented by a signal transmission block 6 connected to another signal transmission block 7 constituted by a position cam representing the instantaneous position of the plow relative to the tractor. An input point 8 consisting of a setting lever is provided to feed the nominal value of the plow position in the soil and acts on a signal transmission block 9 representing a control valve which is connected to a control element 10.

Up to this point the regulating system represented in this signal flow diagram is similar to known depth regulating systems. According to the invention control element 10 comprises 3 possible inputs for different limiting values of the pulling force ($\gamma_1$, $\gamma_2$, $\gamma_3$) or position change rate ($\epsilon_1$, $\epsilon_2$, $\epsilon_3$). The output is connected to mixer 4 over a signal transmission block 11 representing a correcting device used as control variable element for the nominal value of the pulling force. The output of signal transmission block 7 is also connected to a differential device $\dot{L}(t)$, abbreviated hereafter D device, forming the first time derivative of the position of the plow and associated with a memory $\dot{L}(t)m$ storing a relatively large number of the last formed differential values of D device $\dot{L}(t)$, and in which these values are continuously averaged. The outputs of D device $\dot{L}(t)$ and memory $\dot{L}(t)m$ are connected to control element 10. The output of D device $\dot{L}(t)$ is also connected to another D device $(t)$ whose output is connected to signal transmission block 5.

Control element 10 operates as a switch which blocks or opens correcting device 11 in response to the values of the plow position change rate provided by D device $\dot{L}(t)$ and memory $\dot{L}(t)m$ and the supplied values $\epsilon_1$, $\epsilon_2$ and $\epsilon_3$. Values $\epsilon_1$, $\epsilon_2$, and $\epsilon_3$ are set in the production plant and adapted to determined soil conditions, but these values can be subsequently modified. A known logic circuit provides that the correcting device represented by signal transmission block 11 always blocks when D device $\dot{L}(t)$ supplies values greater than $\epsilon_1$ or ranging between $\epsilon_2$ and $\epsilon_3$, $\epsilon_1$ being always the largest value and $\epsilon_3$ the smallest value. The same applies to the signals of memory $\dot{L}(t)m$ and a circuit, also assumed to be known, provides for the blocking of the correcting device (signal transmission block 11) when the average value supplied by memory $\dot{L}(t)m$ of the last determined position change rate is smaller than given value $\epsilon_2$, but remains larger than given value $\epsilon_3$. Then the last available output signal of the correcting device is retained at mixer 4.

In addition to the above described structure the regulating system comprises a D device $\dot{Z}(t)$ forming the first time derivative of the pulling force and a D device (t) forming the second time derivative of the pulling force. These two D devices are connected to the output of signal transmission block 3. The outputs of D devices $\dot{Z}(t)$ and (t) are connected to signal transmission block 5. Similarly to the elements of the logic circuit contained in control element 10, which can be produced by those skilled in the art without inventive activity, differential devices $\dot{L}(t)$, (t), $\dot{Z}(t)$, and (t) and memory $\dot{L}(t)m$ are commercial components, and since their operation is assumed to be known they are not described more specifically at this point.

Regardless of the structural arrangement of the different signal transmission blocks the regulating system operates as follows: First the plow operating depth is set to the desired value by pivoting the setting lever (input point 8). The resistance force applied by the soil (signal transmission block 1) to the sunk plow is transmitted through the implement mounting (signal transmission block 2) to the measuring spring (signal transmission block 3) where it is converted to an electric signal corresponding to the instantaneous pulling force to facilitate subsequent processing. In mixer 4 said signal is superposed on or compared to the signal transmitted by the correcting device (signal transmission block 11). The resulting signal is impressed on the spool valve (signal transmission block 5) of the power lifter (signal transmission block 6) to initiate therein a regulating procedure in which possible operating depth deviations from the predetermined values are eliminated in accordance with the set nominal value of the operating depth and the instantaneous soil conditions. The details of the regulating procedure are not recited here since sufficient literature is available on this subject, e.g. DL patent no. 24, 280.

In order to maintain constant the nominal value adjusted to the plow operating depth in the event of pulling force variation the regulating system must react differently to a deviation caused by a change in soil resistance or by the swaying motion of the tractor.

Therefore the rate of change in the plow position relative to the tractor is determined in a known manner by a position cam (signal transmission block 7) and D device $\dot{L}(t)$. The rate of change is compared in control element 10 with given value $\epsilon_1$. If value $\epsilon_1$ is smaller than the value of the position change rate, which indicates sway, the control valve is blocked (signal transmission block 9). This means that the nominal value adjustment is interrupted instantaneously. The regulating system operates without delay as a pure pulling force regulating system and conventionally eliminates the deviations.

When the value of the position change rate is smaller than given value $\epsilon_1$, but larger than given value $\epsilon_2$, which, on the basis of the selection of the given values $\epsilon_1$, $\epsilon_2$, $\epsilon_3$ on flat soil and of the change in soil resistance, indicates a pulling force variation, the correcting device (signal transmission block 11) is unblocked. In this case the regulating system operates with automatic adjustment of the pulling force nominal value.

When the value of the position change rate becomes smaller than given value $\epsilon_2$, but remains larger than given value $\epsilon_3$, as the tractor moves along a very long ridge so that the swaying motions thereof are small, instead of the values of D device $\dot{L}(t)$, the average values formed in memory $\dot{L}(t)m$ from a relatively large number of the last determined $\dot{L}(t)$ values are used in the comparison with values $\epsilon_2$ and $\epsilon_3$, and the correcting device (signal transmission block 11) is blocked again.

The correcting device (signal transmission block 11) is set up so that, in the blocking state, the last output signal is retained and impressed continuously on mixer 4.

Proper selection of values $\epsilon_1$, $\epsilon_2$, and $\epsilon_3$ makes it possible to adapt the regulating system operation to the prevailing soil formations and properties, and to obtain optimum quality operations since the values formed by D device $\dot{L}(t)$ are considerably larger in the case of pulling force variations due to tractor sway than in the case of pulling force variations due to changes in soil resistance.

To avoid that, in particular, sudden motions of the plow should cause power lifter overloading in general on exceeding of an acceleration threshold value $\epsilon_4$ preliminarily fed to differential device $\dot{L}(t)$ the output of D device (t) opposing the signal originating from mixer 4 is impressed on the input of the spool valve (signal transmission block 5) to weaken therein the effect of the signal transmitted by mixer 4.

To increase the reaction rate of the regulating system, especially on rapid pulling force variation, for example at the beginning of a swaying motion, the output signals of D devices $\dot{Z}(t)$ and (t) are also impressed on the input of the spool valve to amplify the signal transmitted by mixer 4. Then provision must be made so that the D device $\dot{Z}(t)$ or $Z(t)$ first exceeding one of the limiting values $\gamma_{10}$ or $\gamma_{11}$ assigned to that D device should predominate.

Practically the same regulation result is obtained when the time differential of pulling force Z is used instead of the time differential of position L. In this case the output of such a D device is connected to control element 10 as in this embodiment, and limiting values $\gamma_1$, $\gamma_2$, and $\gamma_3$ adapted to the new conditions must be used instead of $\epsilon_1$, $\epsilon_2$, $\epsilon_3$.

To eliminate operating depth deviations preferably resulting from short swaying motions it is also possible to combine the pulling force differential device with the memory which continuously averages a number of values of the position change rate. In this case the correcting device (signal transmission block 11) is blocked in response to large swaying motions by D device $Z(t)$, and in response to long duration swaying motions on gently curving terrain by memory $\dot{L}(t)m$.

While in the above described embodiment the operating depth regulation is based on the rate of change in the plow position relative to the tractor, in the system represented in FIG. 2 the plow operating depth is regulated on the basis of the pulling force variation rate or acceleration.

In this signal flow diagram, as in the signal flow diagram of FIG. 1, the soil resistance is represented by a signal transmission block 1, the plow and implement mount by a signal transmission block 2, and the measuring spring determining the pulling force to be supplied by the tractor by a signal transmission block 3. The position cam determining the plow position relative to the tractor is indicated by a signal transmission block 7. Signal transmission block 7 and signal transmission block 3 are connected to a mixer 4 over a control element 16 whose function will be described below. Mixer 4 is followed by a setting handle 17 adjusting the plow operating depth and the spool valve (signal transmission block 5) of the power lifter (signal transmission block 6). Signal transmission block 3 is connected to two D devices $\dot{Z}(t)$ and (t) connected to a data processing unit 15. Said unit 15, whose output is connected to control element 16, is provided with one input point for the limiting values $\gamma_4$ and $\gamma_5$ of each D device $\dot{Z}(t)$ and (t). The data processing is conducted so that the values supplied by D devices $\dot{Z}(t)$ and (t) are compared to the corresponding value $\gamma_4$ or $\gamma_5$ in a comparator. Only when the value supplied by D device $\dot{Z}(t)$ or (t) exceeds the corresponding given value will the comparator transmit a definite signal whose absolute value is impressed on an Or gate. The output of the Or gate is connected to control device 16.

When the Or gate transmits a signal control device 16 blocks and therefore does not pass the signals traveling from the position cam (signal transmission block 7) to the mixer, but the signal used to block control element 16 is retained in mixer 4. From this moment on the influence of the plow position on the sensivity of the regulating system is limited to the last value.

In this case, to operate the regulating system as a pure pulling force regulating system the set value for the proportion (mixing proportion) with which the measuring spring (signal transmission block 3) participates in the control of the spool valve (signal transmission block 5) must be set to the maximum value by means which are not represented.

This regulating system operates as follows: The desired plow operating depth is preselected with setting handle 17. In response to the output signals of the measuring spring (signal transmission block 3) and of the position cam (signal transmission block 7) the control valve (signal transmission block 5) is adjusted in a known manner so that the plow is driven to the desired operating depth by the power lifter (signal transmission block 6). This procedure requires no detailed description at this point since it does not differ from similar procedures used in known regulating systems.

To maintain the plow operating depth constant regardless of the tractor swaying motions or of the changes in soil resistance the variation rate and the variation acceleration of the pulling force are determined by D devices $\dot{Z}(t)$ and (t) as in the above described embodiment, and impressed on data processing unit 15. The data introduced are processed as described above.

As already indicated the signal transmission from the position cam (signal transmission block 7) to mixer 4 is blocked when the value of the variation rate or acceleration of the pulling force, supplied by D device $\dot{Z}(t)$ or (t), exceeds a determined value. Suitable setting of freely selected values $\gamma_4$ and $\gamma_5$ permits control of the response time of control element 16. When for example, at the beginning of a tractor swaying motion—assuming here that the tractor front wheels move upward first—the pulling force increases first because the plow penetrates deeper into the soil until the regulating system responds, and the values of the pulling force variation rate supplied by D device $\dot{Z}(t)$ also increase according to a certain curve, and the values of the pulling force variation acceleration delivered by D device (t) increase according to another curve. The values $\gamma_4$ and $\gamma_5$ are set so that the curves resulting from the swaying motions of determined least magnitude intersect at any point. Regardless of which of the curves intersects given values $\gamma_4$ and $\gamma_5$ control element 16 is actuated and blocked as soon as said even occurs. Therefore the regulating system acts as a pulling force regulating system without regard to the negatively acting position return signal.

Depending on the sensitivity of the regulating system used control device 16 can be blocked before or after the regulating system has responded to the increasing pulling force. To maintain the operating depths as satisfactorily as possible when the soil resistance changes the effect of the position must be reestablished after the termination of a swaying motion. This means that control element 16 must be returned to its original state.

For this purpose use is made of the fact that the plow position relative to the tractor after termination of the vehicle swaying motion is again in effect. Therefore the output of signal transmission block 7 is impressed on a command element 18 and stored therein when control element 16 blocks. Said signal is compared to the other values supplied by signal transmission block 7 as the swaying motion continues. These values are first considerably different from the stored values, but finally approach them again after the termination of the swaying motion. When the coincidence of the two values is sufficient a suitable signal is transmitted to reset control element 16. If the coincidence cannot be obtained because of the special character of the terrain control element 16 is reset by command element 18 after the vehicle has covered a certain distance, for example 5 or 10 m.

I claim:

1. A method for regulating the operating depth of towed agricultural machinery such as tractor-borne plows with a regulating system utilizing the plow-generated pulling force as an auxiliary control variable, comprising:
   determining the rate of variation of the pulling force;
   providing limiting values for the rate of variation of the pulling force;
   comparing the determined value of the rate of pulling force variation with the limit values; and
   controlling the vertical position of the plow in accordance with the comparison between the determined value and the limiting values.

2. A method according to claim 1 further comprising:
   determining the instantaneous position of the plow relative to the tractor; and
   determining whether the instantaneous position will be used as a control variable for controlling the plow position in accordance with the comparison between said determined values of the rate of pulling force variation and said limit values.

3. A method for regulating the operating depth of towed agricultural machinery such as tractor-borne plows with a regulating system utilizing the plow-generated pulling force as an auxiliary control variable, comprising:
   determining the rate of variation of the pulling force and the acceleration of said pulling force;

providing limiting values for the rate of variation and the acceleration of the pulling force;

comparing the determined values of the rate of variation and acceleration of the pulling force with the limit values; and controlling the vertical position of the plow in accordance with the comparison between the determined values and the limiting values.

4. A method according to claim 3 further comprising:

determining the instantaneous position of the plow relative to the tractor; and determining whether the instantaneous position will be used as a control variable for controlling the plow position in accordance with the comparison between said determined values of said pulling force variation and acceleration and said limit values.

5. A method according to claim 1, 3, 2 or 4 wherein the limit values are set so that the comparison step determines whether the rate of change of the pulling force results from a change in soil resistance or tractor sway.

6. An apparatus for regulating the operating depth of towed agricultural machinery such as tractor-borne plows utilizing the plow-generated pulling force as an auxiliary control variable, comprising:

means for determining the rate of variation of the pulling force;

means for providing limiting values for the rate of variation of the pulling force;

means for comparing the determined values of the rate of variation of the pulling force with the limit values; and means for controlling the vertical position of the plow in accordance with the comparison between the determined value and the limiting values.

7. An apparatus according to claim 6 further comprising:

means for determining the instantaneous position of the plow relative to the tractor; and means for determining whether the instantaneous position will be used as a control variable for controlling the plow position in accordance with the comparison between said determined values of the rate of pulling force variation and said limit values.

8. An apparatus for regulating the operating depth of towed agricultural machinery such as tractor-borne plows utilizing the plow-generated pulling force as an auxiliary control variable, comprising:

means for determining the rate of variation of the pulling force and the acceleration of the pulling force;

means for providing limiting values for the rate of variation and the acceleration of the pulling force;

means for comparing the determined values of the rate of variation and acceleration of the pulling force with the limit values; and means for controlling the vertical position of the plow in accordance with the comparison between the determined values and the limiting values.

9. An apparatus according to claim 8 further comprising:

means for determining the instantaneous position of the plow relative to the tractor; and means for determining whether the instantaneous position will be used as a control variable for controlling the plow position in accordance with the comparison between said rate of pulling force variation and acceleration and said limit values.

10. An apparatus according to claim 9 further comprising:

a measuring spring coupled to a control spool valve of a tractor hydraulic lifter for measuring the plow generated pulling force, wherein the means for determining the instantaneous position of the plow relative to the tractor comprises a transducer coupled to a plow operating-depth setting handle, wherein the means for determining the rate of variation of the pulling force comprises a first differentiator, wherein the means for determining the acceleration of the pulling force comprises a second differentiator, wherein the comparing means comprises a data processor coupled to receive the outputs of the first and second differentiators and the limit value, and wherein the means for determining whether the instantaneous position will be used as a control variable comprises a control element coupled to the data processor, the control means, and the transducer for blocking or passing the output of the transducer to the control means in accordance with the comparison output from the data processor.

11. An apparatus according to claim 6, 8, 7, 9 or 10 wherein the limit values are set so that the comparison means determines whether the rate of change of the pulling force results from a change in soil resistance or tractor sway.

12. A method for regulating the operating depth of towed agricultural machinery such as a tractor borne plow utilizing the regulating system including means for adjusting a nominal value of the pulling force of the plow in response to the soil resistance with a predetermined delay in response to a change in said soil resistance comprising:

determining the plow position;

determining the rate of variation of the plow position;

providing limit values for the rate of variation of the plow position;

comparing the determined values of the rate of variation of the plow position with the limit values; and determining whether the means for adjusting a nominal value of the pulling force of the plow is utilized in regulating the operating depth of the plow in accordance with the results of said comparison.

13. A method according to claim 12 further comprising:

determining the acceleration of the plow position;

providing limit values for the acceleration of the plow position;

comparing the determined values for acceleration of the plow position with the limit values for acceleration; and utilizing the comparison of the determined acceleration and the limit acceleration values in conjunction with the comparison of the determined values of the rate of variation of the plow position with the limit values of the plow position to determine whether the means for adjusting a nominal value of the pulling force of the plow is utilized in regulating the operating depth of the plow.

14. A method according to claim 12 or 13 wherein the limit values are set so that the comparison step determines whether the rate of change of the plow position determines whether the change of the plow position results from a change in soil resistance or tractor sway.

15. An apparatus for regulating the operating depth of towed agricultural machinery such as a tractor borne plow utilizing the regulating system including means for adjusting a nominal value of the pulling force of the plow in response to the soil resistance with a predetermined delay in response to a change in said soil resistance comprising:
  means for determining the plow position;
  means for determining the rate of variation of the plow position;
  means for providing limit values for the rate of variation of the plow position;
  means for comparing the determined values of the rate of variation of the plow position with the limit values; and
  means for determining whether the means for adjusting a nominal value of the pulling force of the plow is utilized in regulating the operating depth of the plow in accordance with the results of said comparison.

16. An apparatus according to claim 15 further comprising:
  means for determining the acceleration of the plow position;
  means for providing limit values for the acceleration of the plow position;
  means for comparing the determined values for acceleration of the plow position with the limit values for acceleration; and
  means for utilizing the comparison of the determined acceleration and the limit acceleration values in conjunction with the comparison of the determined values of the rate of variation of the plow position with the limit values of the plow position to determine whether the means for adjusting a nominal value of the pulling force of the plow is utilized in regulating the operating depth of the plow.

17. An apparatus according to claim 16 further comprising:
  a measuring spring coupled to a control spool valve of a tractor hydraulic lifter for measuring the plow generated pulling force,
  wherein the means for determining the plow position comprises a transducer coupled to the hydraulic power lifter,
  wherein the means for determining the rate of variation of the plow position comprises a first differentiator,
  wherein the means for determining the acceleration of the plow position comprises a second differentiator,
  wherein the means for adjusting a nominal value of the pulling force comprises a correction device coupled to the tractor hydraulic power lifter, and
  wherein the comparing means and the means for determining whether the means for adjusting the nominal value of the pulling force is utilized in regulating the operating depth comprises a control circuit coupled to receive the output of the first and second differentiators and the limit values to produce an output signal for determining whether an output from the correction device is blocked or passed to the tractor hydraulic power lifter depending on the results of the comparison between the differentiator outputs and the limit values.

18. An apparatus according to claim 17 wherein the limit values for the plow position rate of variation are $\epsilon_1$, $\epsilon_2$, and $\epsilon_3$, where $\epsilon_1$ is greater than $\epsilon_2$ and $\epsilon_3$ is less than $\epsilon_2$, and wherein the control means blocks the output of the correction device if the rate of variation of the plow position is greater than $\epsilon_1$ or if it is greater than $\epsilon_3$ but less than $\epsilon_2$, and wherein the control means passes the output of the correction device to the hydraulic power lifter if the rate of variation of the plow position is less than $\epsilon_1$ but greater than $\epsilon_2$.

19. An apparatus according to claim 15, 16, 17 or 18 wherein the limit values are set so that the comparison means determines whether the rate of change of the plow position results from a change in soil resistance or tractor sway.

* * * * *

UNITED STATES PATENT AND TRADEMARK OFFICE
CERTIFICATE OF CORRECTION

PATENT NO. : 4,385,353
DATED : May 24, 1983
INVENTOR(S) : W. Schneider

It is certified that error appears in the above-identified patent and that said Letters Patent are hereby corrected as shown below:

On the title page after item /22/ insert (Under 37 CFR 1.47)

--The application for this Patent was made under 37 CFR 1.47(b).--

Signed and Sealed this

Twenty-fourth Day of January 1984

[SEAL]

Attest:

GERALD J. MOSSINGHOFF

Attesting Officer     Commissioner of Patents and Trademarks